(12) United States Patent
Kang et al.

(10) Patent No.: US 7,835,576 B2
(45) Date of Patent: Nov. 16, 2010

(54) APPARATUS AND METHOD FOR EDITING OPTIMIZED COLOR PREFERENCE

(75) Inventors: Byoung-ho Kang, Yongin-si (KR);
Heui-keun Choh, Yongin-si (KR);
Se-eun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1036 days.

(21) Appl. No.: 11/599,441

(22) Filed: Nov. 15, 2006

(65) Prior Publication Data

US 2007/0154084 A1 Jul. 5, 2007

(30) Foreign Application Priority Data

Jan. 4, 2006 (KR) .................. 10-2006-0001023

(51) Int. Cl.
*G06K 9/00* (2006.01)
*G06K 9/62* (2006.01)
*G06K 9/46* (2006.01)

(52) U.S. Cl. ................. 382/167; 382/156; 382/190

(58) Field of Classification Search ................. 382/156, 382/157, 162, 164, 165, 167, 173, 190, 218–220, 382/224, 225, 254, 276; 358/1.1, 1.18, 1.5, 358/1.9, 515, 518, 530; 345/501–508, 589, 345/600–604, 619
See application file for complete search history.

(56) References Cited

U.S. PATENT DOCUMENTS

| | | | | |
|---|---|---|---|---|
| 5,638,496 A | * | 6/1997 | Sato | 358/1.9 |
| 5,687,303 A | * | 11/1997 | Motamed et al. | 358/1.18 |
| 5,761,327 A | * | 6/1998 | Papritz | 382/112 |
| 5,828,780 A | * | 10/1998 | Suzuki et al. | 382/167 |
| 6,006,013 A | * | 12/1999 | Rumph et al. | 358/1.15 |
| 6,480,299 B1 | | 11/2002 | Drakopoulos et al. | |
| 6,701,010 B1 | * | 3/2004 | Katsuyama | 382/165 |
| 6,961,462 B2 | * | 11/2005 | Watanabe et al. | 382/164 |
| 2005/0185837 A1 | * | 8/2005 | Takano et al. | 382/162 |
| 2007/0070364 A1 | * | 3/2007 | Henley | 358/1.9 |
| 2007/0154084 A1 | * | 7/2007 | Kang et al. | 382/162 |
| 2010/0008568 A1 | * | 1/2010 | Curti et al. | 382/164 |

FOREIGN PATENT DOCUMENTS

| | | |
|---|---|---|
| JP | 06-311353 A | 11/1994 |
| JP | 11-017963 A | 1/1999 |

* cited by examiner

*Primary Examiner*—Amir Alavi
(74) *Attorney, Agent, or Firm*—Sughrue Mion, PLLC (57) ABSTRACT

An apparatus and method for editing an optimized color preference are provided. The apparatus includes a color information controlling unit which extracts data about a preference by comparing color information of a transformed image generated by transforming color information of an original image and the original image according to a user preference; a learning unit which teaches a neural network about the preference, based on the extracted data, and predicts color information variation by the neural network; and an image correcting unit which corrects color information of an input image according to the predicted color information variation. The method includes extracting data about a preference; teaching a neural network about the preference, based on the extracted data; predicting color information variation by the neural network; and correcting color information of an input image according to the predicted color information variation.

17 Claims, 6 Drawing Sheets

APPARATUS AND METHOD FOR EDITING OPTIMIZED COLOR PREFERENCE

CROSS-REFERENCE TO RELATED APPLICATION

This application claims priority from Korean Patent Application No. 10-2006-0001023 filed on Jan. 4, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to editing an optimized color preference, and more particularly, to editing an optimized color preference of an input image by educating a user about color preference patterns by using a neural network when correcting the color information of a color preference area.

2. Description of the Related Art

Digital devices that reproduce color, such as a monitor, a scanner, a printer and others have diversified their functions and enhanced their quality so as to satisfy various requests of users, and are using different color spaces or color models, depending on the field each device is used in. Color models are divided into a device-dependent model and a device-independent model. The device-dependent models include the RGB model, which is an additive color space model, and the CMYK color model, which is a subtractive color space model. And the device-independent models include the CIE L*a*b model, CIE XYZ model, CIE LUV model, and others. For example, the CMYK color space is used in the printing field, and the RGB color space is used in computer monitors.

Further, color preference refers to colors stochastically having a high preference in a color space. The color preference greatly influences the image output performance of the printer or the display device. Therefore, many inventions for editing and correcting the color preference have been disclosed.

However, color transformation appropriate for an individual preference of a user is difficult because the related art inventions provide general color preference transformation functions, and it takes significant time for color preferences to be edited by providing a preference area on a predefined color space to a user, which are problems.

SUMMARY OF THE INVENTION

The present invention provides an apparatus and method for editing an optimized color preference, which can teach a neural network about a preference by extracting data about an individual user's preference in reproducing color preferences, and can predict color information variation by using the neural network.

According to an exemplary embodiment of the present invention, there is provided an apparatus for editing an optimized color preference, the apparatus including a color information controlling unit which extracts data about a preference by comparing color information of a transformed image generated by transforming color information of an original image and the original image according to a user preference; a learning unit in which a neural network learns about the preference, based on the extracted data, and which predicts color information variation by the neural network; and an image correcting unit which corrects color information of an input image according to the predicted color information variation.

According to another exemplary embodiment of the present invention, there is provided a method for an editing optimized color preference, the method including extracting data about a preference by comparing color information of a transformed image generated by transforming color information of an original image and the original image according to a user preference; teaching a neural network about the preference, based on the extracted data; predicting color information variation by the neural network; and correcting color information of an input image according to the predicted color information variation.

BRIEF DESCRIPTION OF THE DRAWINGS

The above and other aspects of the present invention will become more apparent by describing in detail certain exemplary embodiments thereof with reference to the attached drawings in which.

DETAILED DESCRIPTION OF EXEMPLARY EMBODIMENTS OF THE PRESENT INVENTION

Exemplary embodiments of the present invention will be described in detail with reference to the accompanying drawings.

Aspects of the present invention and methods of accomplishing the same may be understood more readily by reference to the following detailed description of exemplary embodiments and the accompanying drawings. The present inventive concept may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 1:
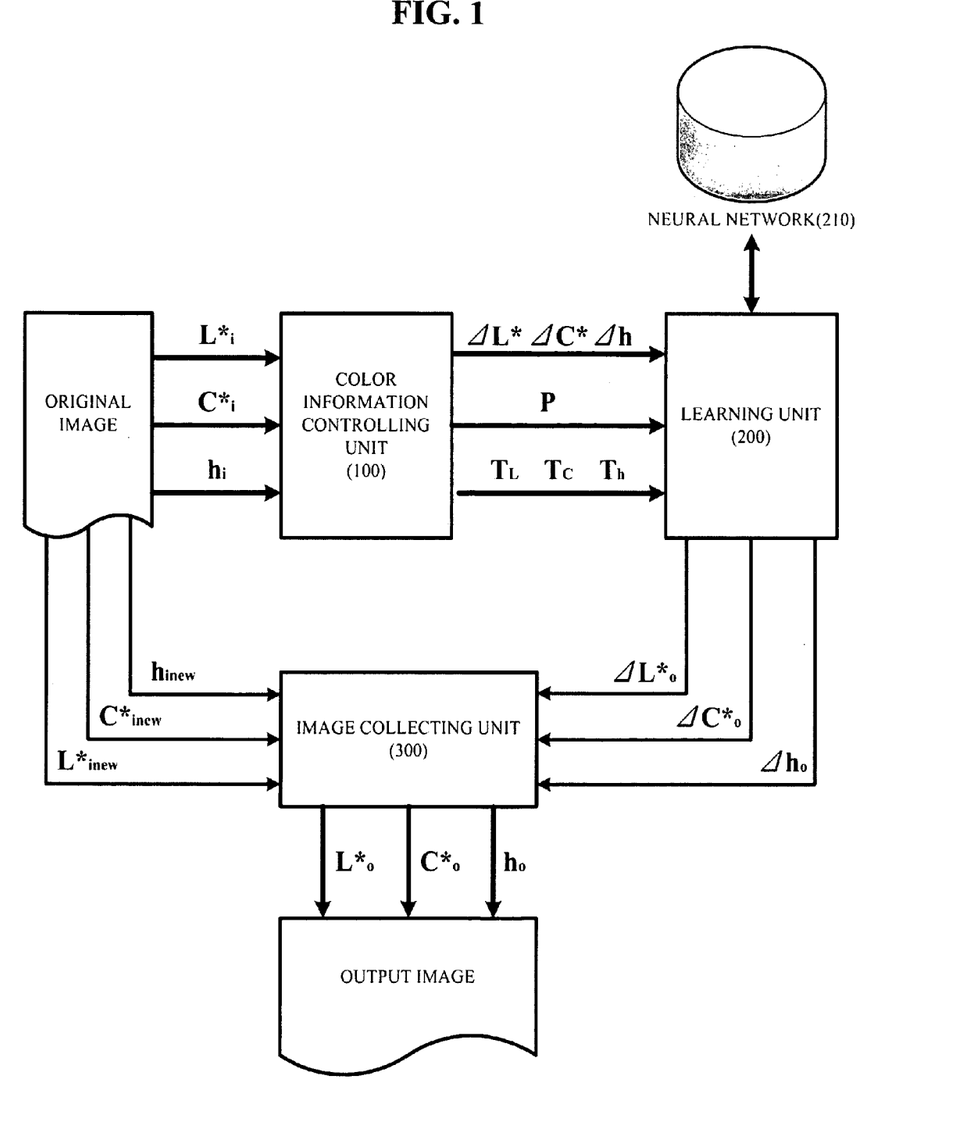
FIG. 1 illustrates a whole structure of an optimized color-preference-editing apparatus according to an exemplary embodiment of the present invention.

FIG. 1 illustrates a whole structure of an optimized color-preference-editing apparatus according to an exemplary embodiment of the present invention. In FIG. 1, the apparatus for editing optimized color preference includes a color-information-controlling unit 100, a learning unit 200, an image-correcting unit 300, and a neural network 210 educated (i.e., taught) by the learning unit 200.

First, if color information of an original image is input to the color-information-controlling unit 100, a user transforms the color information according to his preference, and the color-information-controlling unit 100 extracts data about a user's preference by comparing the color information of the original image and the color information of the transformed image. The color information about the original image is expressed in FIG. 1 as $L_i^*$, $C_i^*$, and $h_i$, and the extracted data is expressed as $\Delta L^*$, $\Delta C^*$, and $\Delta h$. Luminance, which indicates a brightness of a color, is expressed as $L^*$, Chroma or Saturation, which indicates visibility of color, is expressed as $C^*$, and Hue, which indicates a name of a color used to distinguish a color, is expressed as h. Whenever the user edits another original image, the color-information-controlling unit 100 extracts data about another preference. Because a user preference is subjective, the color information can be transformed into a different pattern whenever editing an original image. Hence, the extracted data also always becomes different, so various patterns of data are input to the neural network 210, which will be described later.

Figure 2:
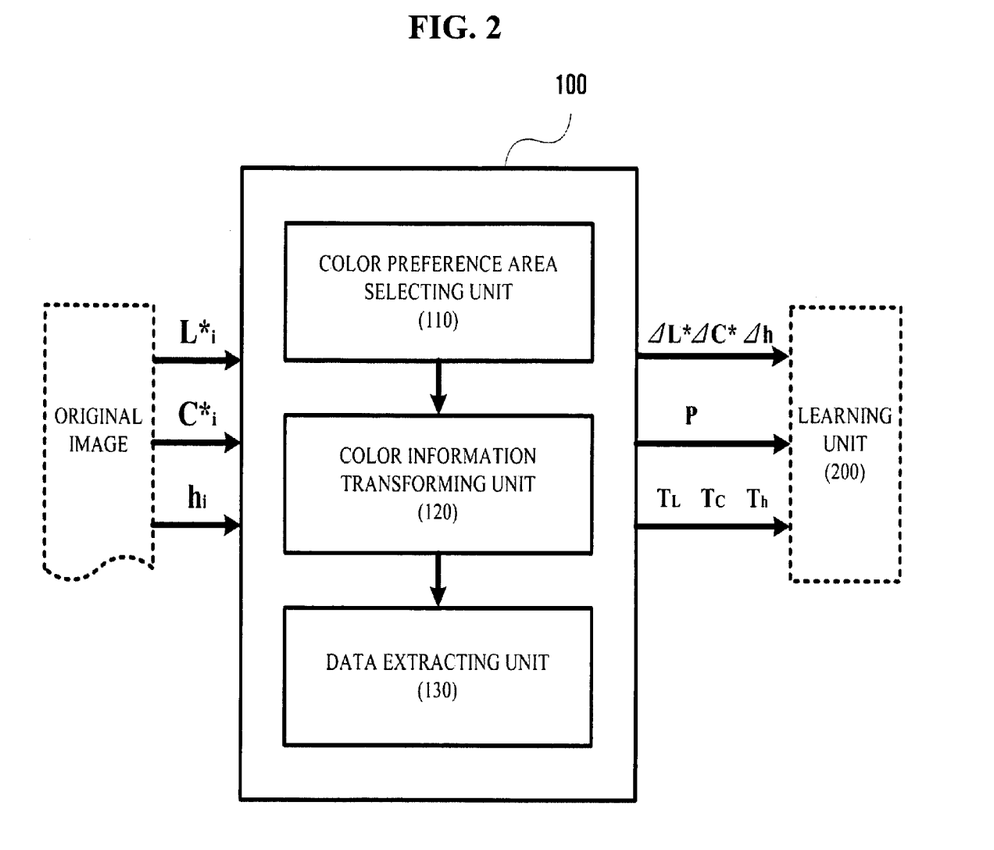
FIG. 2 illustrates a structure of a color-information-controlling unit in the optimized color-preference-editing apparatus according to an exemplary embodiment of the present invention.

The role of the color-information-controlling unit 100 is specifically described with reference to FIG. 2. FIG. 2 illustrates the structure of the color-information-controlling unit 100 in the optimized color-preference-editing apparatus according to an exemplary embodiment of the present invention.

In FIG. 2, the color information controlling unit includes a color preference area selecting unit 110, a color information transforming unit 120, and a data extracting unit 130. If the color preference area selecting unit 110 selects one color preference for transformation in a preference area, the color information transforming unit 120 selects at least one color information and transforms the information so as to generate a transformed image, and the data extracting unit 130 compares color information ($L_i^*$, $C_i^*$, and $h_i$) of the original image with color information of the transformed image and produces the difference so as to extract the data ($\Delta L^*$, $\Delta C^*$, and $\Delta h$).

The color preference denotes a color effectively responding to the visual sense of a user, and in the present invention, the color preference can refer to, for example, skin color, sky blue or grass green, or the like. Because the color preference has the largest effect on the quality of a printed image, the color preference becomes an object for editing according to the preference pattern of the user among various colors.

Figure 3:
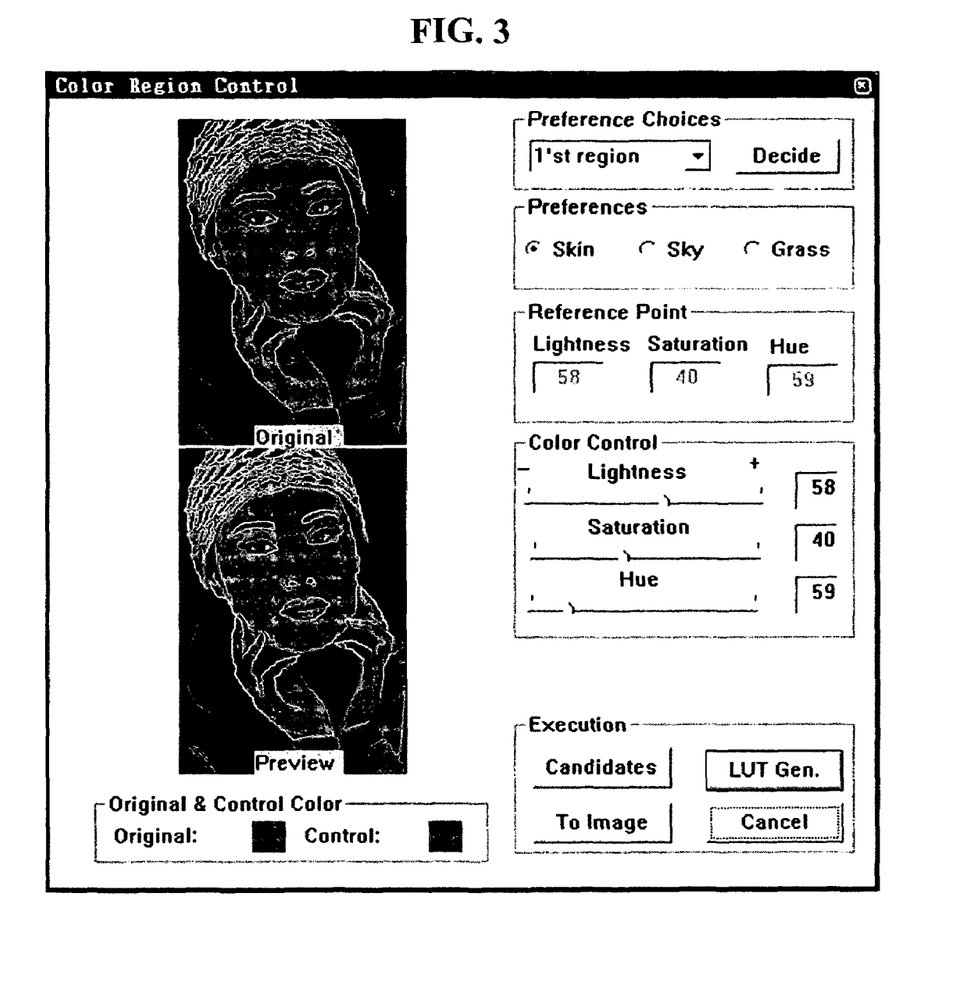
FIG. 3 illustrates a graphical user interface screen of the color-information-controlling unit of FIG. 2.

A process where the color information controlling unit 100 extracts data through a user interface is described with reference to FIG. 3. FIG. 3 illustrates a graphical user interface of the color information controlling unit 100.

An original image and a preview image transformed by a user preference are displayed at the left side of FIG. 3, and colors of the original image and the transformed image are compared in "Original" and "Control" parts under the transformed images. There is a section of the graphic user interface labeled "Preference Choices" that has a drop-down menu which is used in the upper right of FIG. 3 to select an area (i.e., a region) for correction, and a section labeled "Preferences" below of the section "Preference Choices" to select a color preference by the color preference area selecting unit 110. Here, "skin" is checked to correct the skin color in FIG. 3. And under the section "Preferences", a section labeled "Reference Point" indicates the color information by the color information transforming unit 120, and the correction on luminance, chroma (saturation) and hue can be specified by inputting numerical values. In FIG. 3, correction is being made so as to transform an image to have a luminance of 58, chroma of 40, and a hue of 59. Further, under "Reference Point", the luminance, the chroma (saturation) and the hue can be readjusted at an interface "Color Control". Further, an interface section "Execution" at the lower right side of FIG. 3 has a button "Candidates" to re-select a plurality of transformed images as preview images, a button "LUT Gen." to call up a lookup table on luminance, saturation and hue, a button "To Image" to display a preview of the transformed image, and a button "Cancel" to cancel an execution.

Further, the color information controlling unit 100 repeatedly extracts data ($\Delta L^*$, $\Delta C^*$, and $\Delta h$) about a preference pattern of the user by the above process, and outputs information about coordinates ($T_L$, $T_C$, $T_h$) of color information of a certain target point and a determination variable P on a color preference area constituting the original image together to the learning unit 200.

The learning unit 200 educates (i.e., teaches) the neural network 210 on the preference by using the extracted data ($\Delta L^*$, $\Delta C^*$, and $\Delta h$), coordinates ($T_L$, $T_C$, $T_h$) of a certain target point, and the determination variable P information on the color preference area, and the learning unit 200 predicts color information variation ($\Delta L_o^*$, $\Delta C_o^*$, $\Delta h_o$) in advance by using the educated neural network. The neural network 210 is described with reference to FIG. 4.

Figure 4:
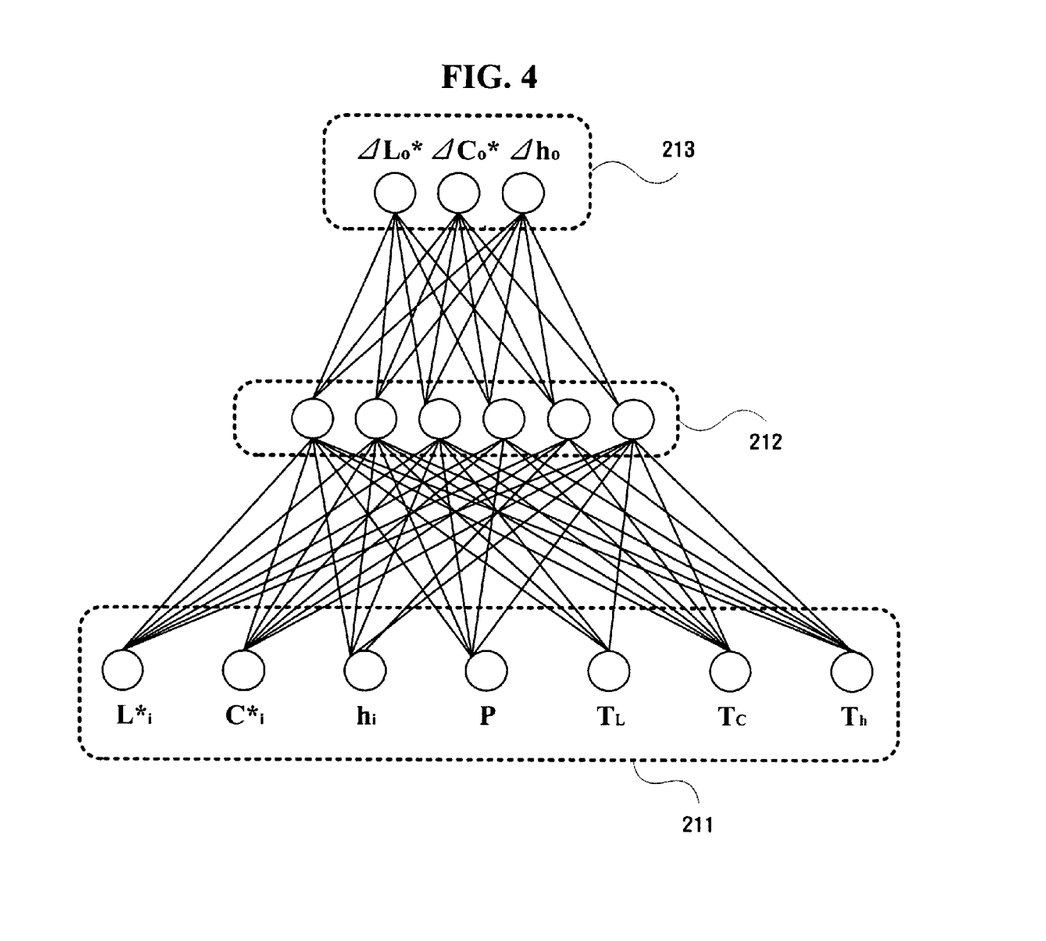
FIG. 4 illustrates a neural network according to an exemplary embodiment of the present invention.

FIG. 4 illustrates a neural network 210 according to an exemplary embodiment of the present invention. The neural network refers to a kind of program or data structure system, which is modeled by graphs and mathematical algorithms from ideas of biological neural networks. Here, the neural network comprises units made by modeling biological neurons and weighted connections between the units, and has various structures and unique learning rules, depending on each neural network model. The neural network 210 comprises sets of processing elements grouped by layers as illustrated in FIG. 4. As an example, the neural network 210 shown in FIG. 4 has an input layer 211 having seven input units, a middle layer 212 having six units, and an output layer 213 having three output units. Several layers can exist between the input layer 211 and the output layer 213, and in the exemplary embodiment of the present invention shown in FIG. 4, there is only one middle layer 212 optimized by 6 units.

To the input layer is input color information ($L_i^*$, $C_i^*$, and $h_i$) of the original image, color information ($T_L$, $T_C$, $T_h$) of a certain target point specified according to a user preference, and determination variable information P to determine one area among color preference areas comprising the original image. Here, the determination variable information grants different determination variables by color preference areas. For example, 0 is granted for skin color, 1 for sky blue, and 2 for grass green.

If such information is input to the input layer 211, the neural network 210 uses a connection weight so as to reflect connection of layers, and the output layer 213 of the neural network 210 calculates an input value by using the transmitted input information and the connection weight, then predicts color information variation (indicated as $\Delta L_o^*$, $\Delta C_o^*$, $\Delta h_o$ in FIG. 1) output to the output layer 213. In other words, because the neural network 210 has a feature of acquiring knowledge by itself through repetitive learning of given learning patterns, the output layer 213 outputs information about the predicted color information variation ($\Delta L_o^*$, $\Delta C_o^*$, $\Delta h_o$).

The neural network 210, which predicts color information variation of the input image by the above method in advance, can be learned by applying a back-propagation algorithm. The back-propagation algorithm is a multilayer algorithm and a learning algorithm used in a feed forward neural network, and because a supervised learning is used for learning, there should be input data and wanted output data in order to extract data. First, if a process of multiplying and adding input data (for example, in the exemplary embodiment of the present invention, seven units of data) of the input layer is repeated, an output, a result value, is the outcome. Here, because the output is different from a wanted output value given in data, a target error, which is a difference between the output, a result of the input, and an output value, is generated, and the weight of the output layer 213 is updated in proportion to the error, then the weight of the middle layer 212 is updated. For all data, the weight is updated until the error becomes smaller than a critical value. The critical value may be predetermined. In other words, the direction of updating the weight is opposite to the processing direction. If the weight is continually updated like the above, it becomes possible for the neural network 210 to predict in advance how much color information needs to be corrected on a new input image. The predicted value is indicated as $\Delta L_o^*, \Delta C_o^*, \Delta h_o$, which are color information variation, in FIGS. 1 and 4.

If a new input image is input to an optimized color preference editing apparatus, as the image correcting unit 300 reflects the predicted color information variation ($\Delta L_o^*, \Delta C_o^*, \Delta h_o$) on color information ($L_{inew}^*, C_{inew}^*$, and $h_{inew}$) of the new input image, a new image, which is a correction of the input image, is output. The color information corrected by the image correcting unit 300 is indicated as $L_o^*, C_o^*, h_o$, showing that the information is toward the output image.

Figure 5:
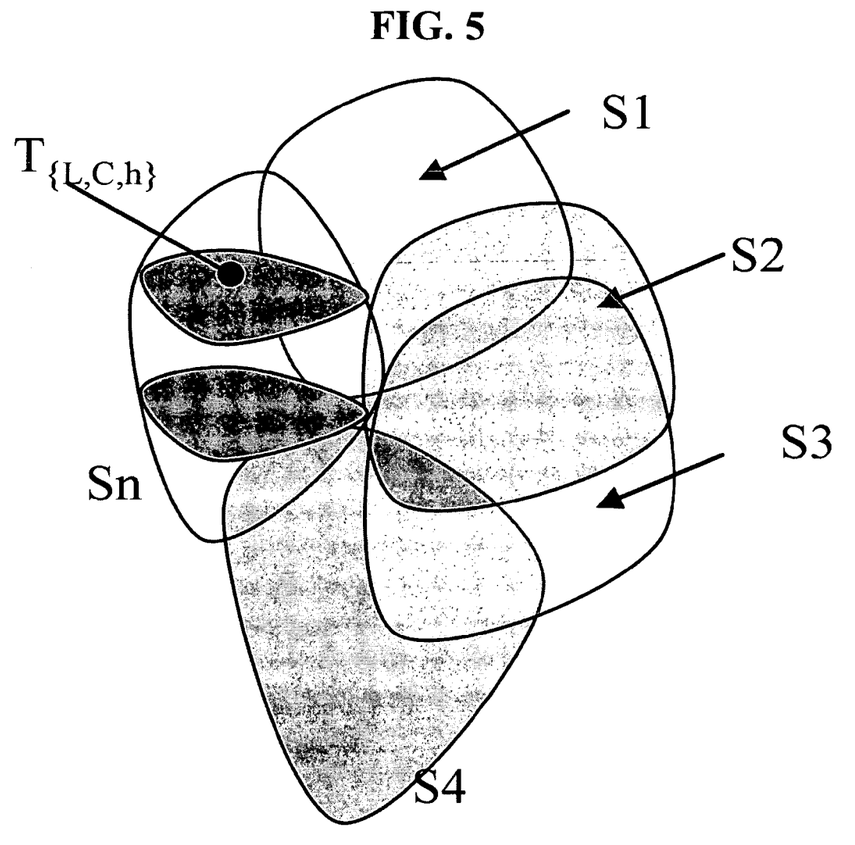
FIG. 5 illustrates a process of predicting color information variation by using a neural network according to an exemplary embodiment of the present invention.

Further, FIG. 5 illustrates a process of predicting color information variation ($\Delta L_o^*, \Delta C_o^*, \Delta h_o$) using the neural network according to an exemplary embodiment of the present invention. In FIG. 5, S1, S2, S3, S4 and S5 refer to a three-dimensional color preference area, and $T_{\{L, C, h\}}$ refers to a certain target coordinate specified according to a user preference among color preference areas. As illustrated in FIG. 5, the color preference area consists of three elements of luminance, chroma (saturation), and hue, and the color preference transformation uses a probability variable in moving the color preference to the center of the target coordinate $T_{\{L, C, h\}}$ so as to transform color information of the total color space.

The term "unit" used in this exemplary embodiment refers to a hardware element such as a Field Programmable Gate Array (FPGA) or an Application Specific Integrated Circuit (ASIC), and "unit" executes certain roles. "Unit" can exist in addressable storage media, or regenerate one or more processors. For example, "unit" can include software elements, object-oriented software elements, class elements, task elements, processes, functions, attributes, procedures, circuits, data, database, data structures, tables, arrays, and/or variables. Elements and functions provided in "units" can be combined into fewer elements or "units", or can be divided into additional elements and 'units'.

Figure 6:
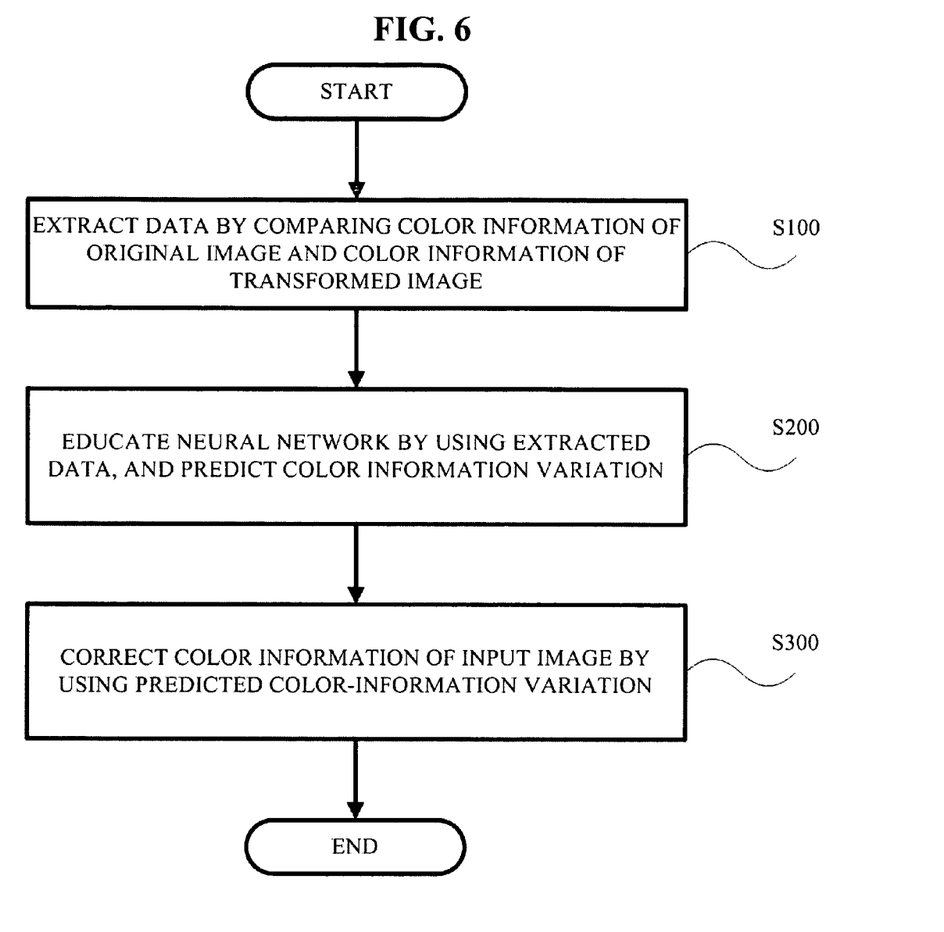
FIG. 6 is a flow chart illustrating a method of editing optimized color preference according to an exemplary embodiment of the present invention.

Hereinafter, an exemplary embodiment of the present invention is described with reference to FIG. 6. FIG. 6 is a flow chart illustrating a method for editing optimized color preference according to an exemplary embodiment of the present invention.

First, the color information controlling unit 100 extracts data ($\Delta L^*, \Delta C^*, \Delta h$) on preference by comparing color information ($L_i^*, C_i^*$, and $h_i$) of an original image and color information of a transformed image made by transforming the original image according to the a user preference S100.

In step S100, if the color preference area selecting unit 110 selects a certain color preference area of the original image, the color information transforming unit 120 selects and transforms at least one set of information among color information of the selected color preference area, thereby generating the transformed image. And the data extracting unit 130 compares color information of the transformed image and color information of the original image, and then produces the difference, thereby extracting the data.

It is advantageous that the color preference area includes a skin color area, a sky blue area, or a grass green area, and the color information includes luminance, chroma and hue.

Using the extracted data, the learning unit 200 educates (i.e., teaches) the neural network about a user preference, and color information variation ($\Delta L_o^*, \Delta C_o^*, \Delta h_o$) is predicted by using the educated neural network 210 S200.

The neural network comprises the input layer 211 having seven input units, the middle layer having six units, and the output layer having three output units, and is educated using a back-propagation algorithm. To the input layer 211 is input color information ($L_i^*, C_i^*$, and $h_i$) of the original image, color information of a certain target point ($T_L, T_C, T_h$) specified according to a user preference, and a determination variable information P to determine one area among color preference areas constituting the original image, and the output layer 213 outputs information about the predicted color information variation ($\Delta L_o^*, \Delta C_o^*, \Delta h_o$). Because the back-propagation algorithm and the learning process of the neural network 210 have been described before, the detailed description is omitted here.

Finally, the image correcting unit 300 corrects color information of an input image ($L_{inew}^*, C_{inew}^*$, and $h_{inew}$) by using color information variation ($\Delta L_o^*, \Delta C_o^*, \Delta h_o$) predicted by the learning unit 200 S300. The input image is a newly input image.

It is clear that the range of rights of an optimized color preference editing apparatus according to an exemplary embodiment of the present invention includes a computer-readable recording medium that records program code to execute such a method in a computer.

It will be understood by those of ordinary skill in the art that various replacements, modifications and changes may be made in the form and details without departing from the spirit and scope of the present inventive concept as defined by the following claims. Therefore, it is to be appreciated that the above described exemplary embodiments are for purposes of illustration only and are not to be construed as limitations of the invention.

According to an apparatus and method for editing optimized color preference according to exemplary embodiments of the present invention, data about an individual user preference is extracted, then a neural network is educated on preference, and then color information variation can be predicted by using the educated neural network.

What is claimed is:

1. An apparatus for editing optimized color preference, the apparatus comprising:

a color information controlling unit which extracts data about a preference by comparing color information of a transformed image generated by transforming color information of an original image and the original image according to a user preference;

a learning unit which teaches a neural network about the preference, based on the extracted data, and predicts color information variation by the neural network; and an image correcting unit which corrects color information of an input image according to the predicted color information variation.

2. The apparatus of claim 1, wherein the color information controlling unit comprises:
- a preference information selecting unit which selects a color preference area of the original image;
- a color information transforming unit which generates the transformed image by selecting and transforming at least one color information among a plurality of color information of the selected color preference area; and
- a data extracting unit which extracts the data by comparing color information of the transformed image and color information of the original image.

3. The apparatus of claim 2, wherein the color preference area comprises a skin color area, a sky blue area, or a grass green area.

4. The apparatus of claim 2, wherein the color information comprises luminance, chroma and hue.

5. The apparatus of claim 1, wherein the learning unit teaches the neural network by applying a back-propagation algorithm.

6. The apparatus of claim 5, wherein the neural network comprises an input layer having seven input units, a middle layer having six units, and an output layer having three output units.

7. The apparatus of claim 6, wherein color information of the original image, color information of a target point specified according to a user preference, and determination variable information to determine one area among a plurality of color preference areas of the original image are input to the input layer.

8. The apparatus of claim 6, wherein the output layer outputs information about the predicting color information variation.

9. A method for editing optimized color preference, the method comprising:
- using at least one processor to perform the steps of:
- extracting data about a preference by comparing color information of a transformed image generated by transforming color information of an original image and the original image according to a user preference;
- teaching a neural network about the preference, based on the extracted data;
- predicting color information variation by the neural network; and
- correcting color information of an input image according to the predicted color information variation.

10. The method of claim 9, wherein the extracting the data comprises:
- selecting a color preference area of the original image;
- generating the transformed image by selecting and transforming at least one set of color information among a plurality of color information of the selected color preference area; and
- extracting the data by comparing color information of the transformed image and color information of the original image.

11. The method of claim 10, wherein the color preference area comprises a skin color area, a sky blue area, or a grass green area.

12. The method of claim 10, wherein the color information comprises luminance, chroma and hue.

13. The method of claim 9, wherein the teaching the neural network comprises applying a back-propagation algorithm.

14. The method of claim 13, wherein the neural network comprises an input layer having seven input units, a middle layer having six units, and an output layer having three output units.

15. The method of claim 14, wherein color information of the original image, color information of a target point specified according to a user preference, and determination variable information to determine one area among color preference areas constituting the original image are input to the input layer.

16. The method of claim 14, wherein the output layer outputs information about the predicted color information variation.

17. A non-transitory computer-readable recording medium that records program code to execute in a computer a method for editing optimized color preference, the method comprising:
- extracting data about a preference by comparing color information of a transformed image generated by transforming color information of an original image and the original image according to a user preference;
- teaching a neural network about the preference, based on the extracted data;
- predicting color information variation by the neural network; and
- correcting color information of an input image according to the predicted color information variation.

* * * * *